United States Patent [19]

Revord et al.

[11] Patent Number: 5,046,006
[45] Date of Patent: Sep. 3, 1991

[54] MUTUAL MISSILE CONTROL SYSTEM

[75] Inventors: Raoul D. Revord, 323 Maple St., Munising, Mich. 49862; Jeffrey Shaya, Ann Arbor, Mich.

[73] Assignee: Raoul D. Revord, Munising, Mich.

[21] Appl. No.: 317,192

[22] Filed: Feb. 28, 1989

Related U.S. Application Data

[63] Continuation-in-part of Ser. No. 200,034, May 27, 1988, abandoned.

[51] Int. Cl.[5] .................... G06G 15/20; G06G 15/50; F41G 9/00
[52] U.S. Cl. ..................................... 364/423; 89/1.11
[58] Field of Search ........................ 364/423; 358/108; 273/351, DIG. 28; 73/167; 89/1.11

[56] References Cited

U.S. PATENT DOCUMENTS 4,726,224  2/1988  D'Ausilio .............................. 73/167

OTHER PUBLICATIONS

Bunker et al., "Super Radot-Tracking Techniques", Proceedings of the Society of Photo-Optical Instrumentation Engineers, Fort Walton Beach, Fla., Mar. 13-14, 1978.
Coon, Gene L. and Hamner, Robert; "A Taste of Armageddon"; Star Trek 2; Feb. 1969, pp. 13-25.

*Primary Examiner*—Felix D. Gruber
*Attorney, Agent, or Firm*—Krass & Young

[57] ABSTRACT

A system for controlling the nuclear arsenals of two adversaries. The system includes a central control computer that is in communication with at least two command terminals, each operated by one of the adversaries. The central control computer is in communication with the missiles and has exclusive control over the launch sequences needed to fire them. To fire a missile, an adversary must make a request to the central control computer from a command terminal. When a first strike is requested by one adversary, the central control computer allows the other adversary to fire their missiles while preventing the requester from firing for a predetermined amount of time. The system includes computers on-board the missiles that allow the central control computer to monitor whether any missile is being tampered with. The system further allows the adversaries to request permission for the decommission of any missiles.

30 Claims, 13 Drawing Sheets

MUTUAL MISSILE CONTROL SYSTEM

This application is a continuation-in-part of application Ser. No. 200,034, filed May 27, 1988 and now abandoned.

FIELD OF THE INVENTION

This invention relates to a missile launch control system and in particular to a system which exercises mutual computer control over the firing of missiles at one another by adversaries. More particularly the system of the present invention exercises mutual computer control over missiles in such a way as to highly discourage a first strike.

BACKGROUND OF THE INVENTION

Since the advent of the nuclear age, mankind has lived with the threat of a nuclear first strike. As an answer to this threat defensive systems have been developed to counter a first strike by detonating incoming warheads before they reach their targets. The current and costly research into the Strategic Defense Initiative (SDI) is evidence of the continued attempt to advance this answer. Although there are many supporters of such an approach, it is feared by many that the ultimate result of a completely working SDI system would be to provide the party owning it too much security and thereby give them incentive to launch a first strike. Only if the two adversaries had completely functioning SDI systems would such a problem be alleviated. However, the possibility of two adversaries expanding their battlegrounds to outer space, a possibility that the current trend does not make improbable, does not bring much comfort to anyone.

It has become clear that a joint solution, consented to by both the adversaries, may be the only way to alleviate the threat of a nuclear first strike. With advances that have been made in communications, computer control and orbital space technology, it is now within existing technological capabilities to design a mutual system which would highly discourage nuclear war and in particular a first strike. The present invention is directed to such a system.

SUMMARY OF THE INVENTION

The present invention is a mutual strategic defense system that exercises mutual control over a plurality of missiles divided between two adversaries. The missiles in this system are of the type that exist in an inactive or inoperable state wherein the missiles are unarmed and unable to be armed or fired, and a second active state wherein the missiles are set up to accept launch sequences which allow arming and firing.

The system by which control is exercised is established between a central control computer, at least two command terminals, and a plurality of missiles divided between the two adversaries. The system is designed in such a way as to allow for communication between the central control computer and each of the said command terminals and the firing control systems of each of the missiles. The central control computer has exclusive control over the launch sequences necessary to fire any and all missiles. In order to fire missiles, an adversary must make a request to the central control computer from its command terminal.

When activation of the launch sequences for its armaments is requested by a first one of the adversaries, the control computer, after a predetermined time delay, activates the launch sequences of the second adversary's armaments and imposes a longer predetermined time delay on the activation of the armaments of the first adversary.

The system may further include protective means associated with the central computer as well as verification means associated with the terminals to assure access only by authorized personnel.

The system may further include means for the central control computer to monitor the status of the missiles in order to determine whether any are being tampered with. Upon detection of such tampering, an appropriate action, such as detonation of that warhead on site, is taken by the central control computer.

The system may also allow either adversary to request the decommission of any of its missiles. Such decommission requires the responsive consent of the nonrequesting adversary before the central control computer authorizes it.

The effective action of this system is to impose a substantial deterrent on the initiation of a missile exchange. This action is achieved by granting a would-be victim the right of before-the-fact retaliation and imposing a substantial penalty upon the initiating party.

BRIEF DESCRIPTION OF THE DRAWINGS

The objectives, advantages, and applications of the present invention will be made apparent by the following detailed description of the preferred embodiment of the invention. The description makes reference to the accompanying drawings in which.

DETAILED DESCRIPTION OF THE PREFERRED EMBODIMENT

Figure 1:
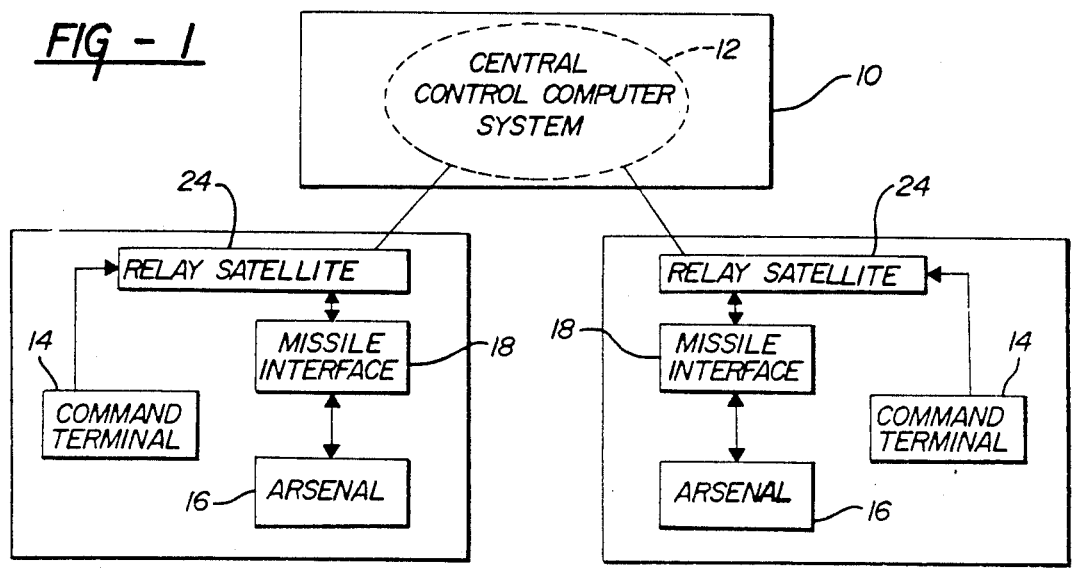
FIG. 1 is a perspective view of the entire mutual strategic defense system.

FIG. 1 depicts an overview of the preferred embodiment of the present invention. A satellite commmunication system 10, in geosynchronous orbit, contains a central control computer system (CCCS) 12 that is in communication with at least two terminals 14 operated by each adversary. The CCCS 12 is in constant communication with the nuclear arsenals 16 of each adversary. The missiles of each arsenal 16 include every missile, whether it be land based, in a submarine, or airborne. The CCCS 12 has exclusive control over the launching of each missile. The system is in possession of the launch sequences necessary to launch any missile. Neither of the possessors of missiles have access to these launch sequences. In order to launch a missile, a possessor must make a request to the CCCS 12 from their terminal 14. Each adversary has access codes that allow them access to the CCCS 12 from their terminals 14. These access codes can be changed at will. To further ensure security and limit the terminals' use to authorized personnel, an alternative embodiment including innovative positive identification measures, such as palm print, retina, or voice identification, may be implemented. An alternative embodiment may also include remote terminal communication systems, where the adversaries have access to their terminals from remote locations.

Each missile of both nuclear arsenals 16 has an onboard computer control system that is interfaced with that missiles detonating mechanism. Each missile control system is in constant communication with the CCCS 12 via a relay satellite 24, and is capable of receiving a launch sequence. The CCCS is capable of attempting to detonate any missile warhead in either arsenal. The on-board missile computer systems also provide the CCCS information that allows it to monitor whether any missiles are being tampered with. This information preferably includes the monitoring cf any entry into the on-board computer system of the missile, any changes in temperature or missile telemetry, the removal of the canopy enclosing the warheads, or any unauthorized attempts to submit launch sequences. The CCCS will assign every missile in its system an identification code that accompanies every communication between the CCCS and the on-board computer of each missile. The missiles and the CCCS communicate through relay satellites, and the interface between each missile and the CCCS will depend upon the configuration of the missile.

The missiles in each arsenal are in either an inactive state, wherein the missiles are unarmed and unable to be armed and fired, or an active state, wherein the missile interfaces are set up to accept launch sequences provided by the CCCS to the terminal which allows arming and firing. While the present invention is in operation, the CCCS 12 controls the state of and constantly monitors all missiles in the nuclear arsenals 16. If a missile has been fired after the launch sequences have been set up at the missile site, this information is also sent to the CCCS.

Either adversary is allowed to give a limited set of commands to the CCCS 12 from their terminal 14. These commands include requests to change the CCCS terminal access codes, missile launch requests, requests to decommission one or more missiles, the release of current launch sequences, and consent to a requested decommission. An adversary releasing current launch sequences results in all launch sequences being invalidated by the CCCS if a launch request has been previously withdrawn by the initiating member. The requests for decommission require the responsive consent of the adversary, in a predetermined time period, before authorization is transmitted from the CCCS. During this predetermined time period, the non-requesting adversary is capable of issuing a consent pending command from its terminal. This command stops the timer and thereby grants the adversary more time to decide whether to consent to the requested decommission. Any unauthorized attempt to decommission a missile, i.e. to break the communication link between a missile and the CCCS, will result in an appropriate action by the CCCS.

If a request for a first strike is made by one party, the CCCS, after an initial delay, puts the nuclear arsenal of the non-requesting party in the active state by providing launch codes to that party and enabling those codes at the missile sites. In the preferred embodiment, the initial delay is 20 minutes. The nuclear arsenal of the requesting party, however, is kept in the inactive state throughout the initial delay and for a further predetermined amount of time. In the preferred embodiment of the present invention this time is 90 minutes. If it wishes, the non-requesting party can order any of its missiles launched while the requesting party is unable to launch its missiles during the predetermined time period. During the initial delay, the first strike request can be canceled by the requesting party. After expiration of this time window, a request for a cancellation must be confirmed by the adversary. A cancellation returns the system to its normal operation and all system missiles to the inactive state.

Figure 2:
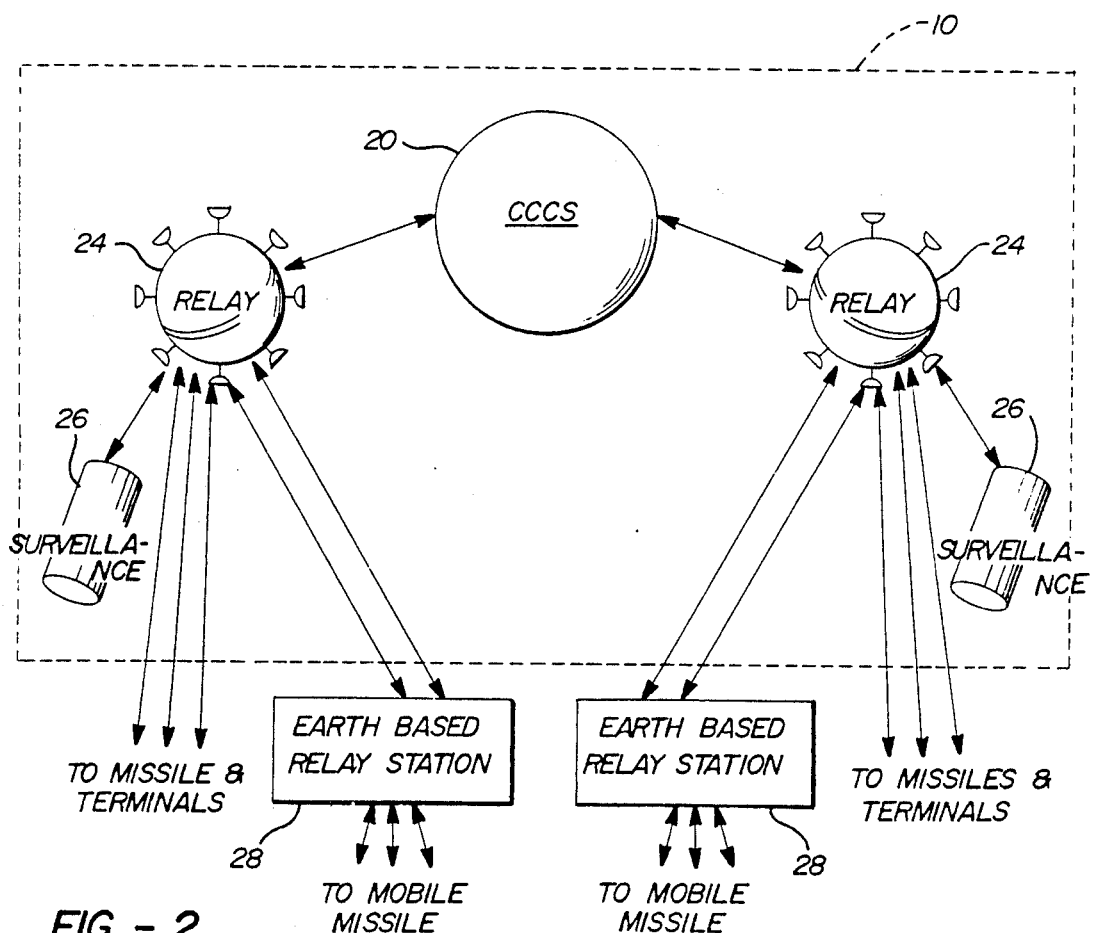
FIG. 2 is a schematic diagram of the satellite communication system in FIG. 1.
Figure 13:
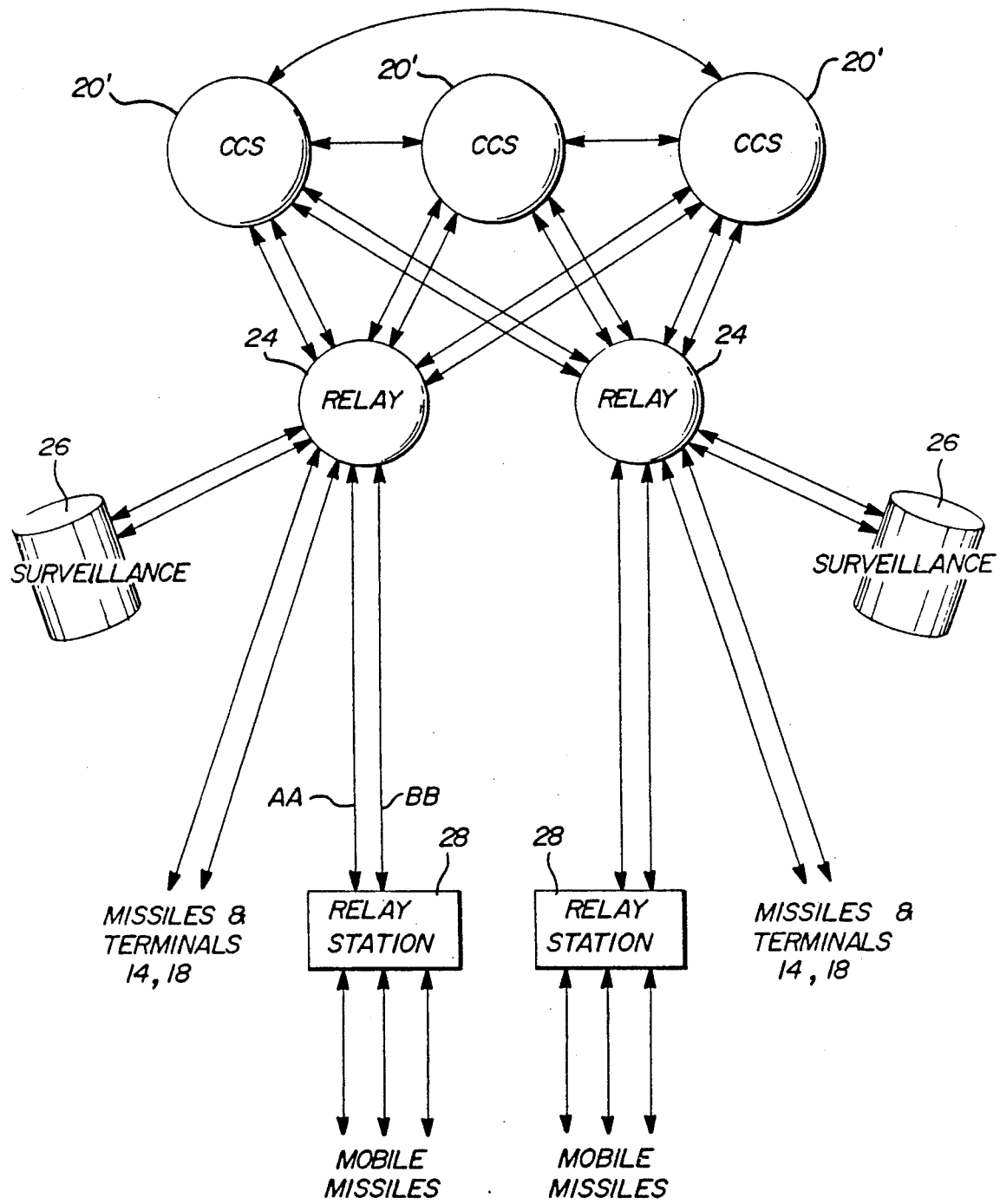
FIG. 13 is a schematic diagram of an alternative embodiment of the satellite communication system in FIG. 1 including distributed control.

FIG. 2 depicts a detailed schematic of the satellite communication system 10. The satellites in 10 are in geosynchronous orbit. The present invention is controlled by the central control computer system satellite 20 (CCCS). FIG. 13 depicts an alternative embodiment wherein a redundant system of distributed control computer system satellites 20' are used in order to increase the reliability of the system when performing the necessary surveillance, communication, and computational tasks. Three control computer system (CCS) satellites 20' are shown in this embodiment, but any number of CCS satellites may be used. Each of these CCS satellites 20' are deployed so as to be in direct communications with each other as well as with one or more relay satellites 24. In the preferred embodiment the minimum number of relay satellites is determined by the geographical area in which the missiles of the system are deployed. The relay satellites 24 deliver all messages received from the command terminals 14, the missile interfaces 18, surveillance satellites 26 and earth-based relay stations 28 to each CCS satellite 20'. Each one of these satellites 20' receives identical information, carries out the same computation and passes the same messages to the destination component.

Figures 7, 8:
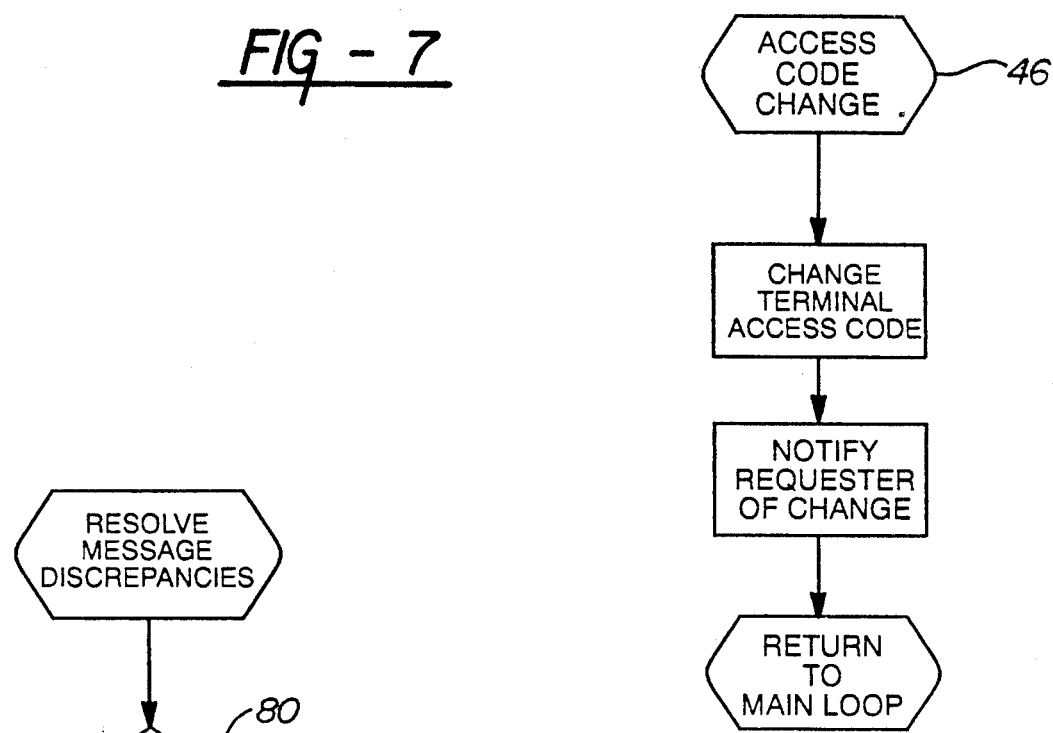
FIG. 8 is a logic flow diagram of a message discrepancy resolution algorithm.

To use this redundancy for increased reliability, the relay satellites 24, the earth-based relay stations 28, the missile sites, terminals, and surveillance satellites 26 must artitrate between possibly conflicting information. Referring now to FIG. 8, there is shown a logic flow diagram of an algorithm illustrating how each of these components resolves discrepancies between messages received from different control computer satellites 20'. After receiving the messages from different sources, such as control satellites, the components determine whether the information contained therein is conflicting 80. If the information from different control satellites is identical, then the component takes the appropriate action at step 82. If there is a discrepancy, the component determines whether there is a plurality of one message 84. If there is a plurality, the component takes action based on the plurality 86. If there is no plurality, the component takes action based on the information received from the command satellite designated as the primary satellite 88. If there is only a single source of the message, as in a system with only one CCCS satellite, there can be no conflict of information. To account for the possibility of a control satellite having a faulty communication or even a total failure of communication, all components of the system make valid decisions upon receiving conflicting information.

Referring back to FIGS. 2 and 13, the CCCS 20 and the distributed control computer system 20' communicate with relay satellites 24. In the alternative embodiment of FIG. 13, the relay satellites 24 communicate with each of the CCS's 20' in the distributed system. As shown in FIG. 13, the components of the system may communicate on redundant communication paths as indicated, for example, by the lines A—A and B—B between space-based relay station 24 and earth-based relay station 28. This redundancy in communication links between any two components ensures that the transmitted message is received at the destination location. The relay satellites 24 provide means for communication between the CCCS 20 and the missiles 16, the terminals 14, surveillance satellites 26 or earth-based relay stations 28. The relay satellites 24 maintain unique encryption key data for each channel of communication. The relay satellites 24 receive messages from the command satellites 20 which contain, among other things, information as to which frequency band and encryption key to utilize as shown in FIG. 9.

Figure 9:
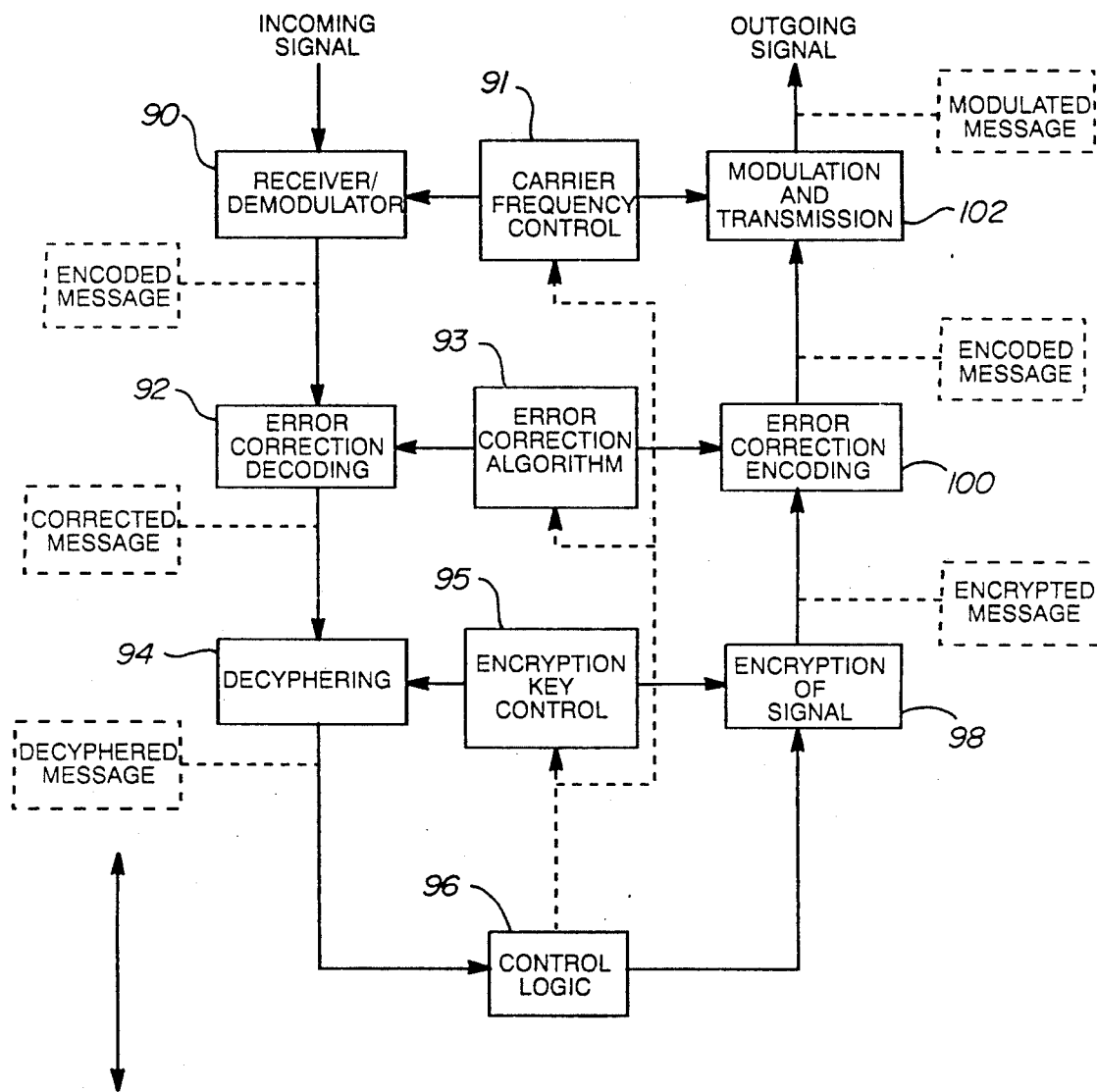
FIG. 9 is a schematic drawing of a communication channel present in each system component of the present invention.

FIG. 9 is a schematic drawing of the communication channel present in each component of the system. After receiving an incoming message or an incoming message with another destination, the component, such as a relay satellite 24, must first demodulate at step 90, decode at step 92, and then decipher at step 94 the message using the frequency band information shown at step 91, the error correction algorithm at step 93 and the encryption key information of step 95 maintained for that communication channel. The interpretation of frequency and encryption information, as well as routing information, is carried out by the control logic 96.

The relay station or satellite or other like component must then examine routing information also contained in the message, i.e., the component to which the message will be transmitted, and direct the message onto the appropriate communication channel. The routing information specifies the path of a message from source to destination. The control logic 96 of the relay satellite 24 associates a specific channel for each possible destination and routes a message accordingly. If a relay satellite or station receives a message over a communication link other than one specified in the message, the control logic 96 appends a new message to the incoming message reporting that the routing path specified in the incoming message was incorrectly followed.

The integrity of the message is preserved by the relay satellite by changing the encryption of the message as it passes onto a new channel as will be explained in detail below. Once the message is passed to the correct channel, the message is queued up for transmission. If the channel is in use, the message waits for the channel to clear. As shown in FIG. 9, once the channel is clear, the message is encrypted at step 98 using the encryption keys for that channel, encoded at step 100 and transmitted at step 102 to the correct destination using the frequency band, the error correction algorithm 93 and the encryption key information set up for that channel. The relay satellite, through control logic 96, time-multiplexes the messages on each channel so that consecutive or concurrent messages do not interfere or overlap with each other.

Figure 14:
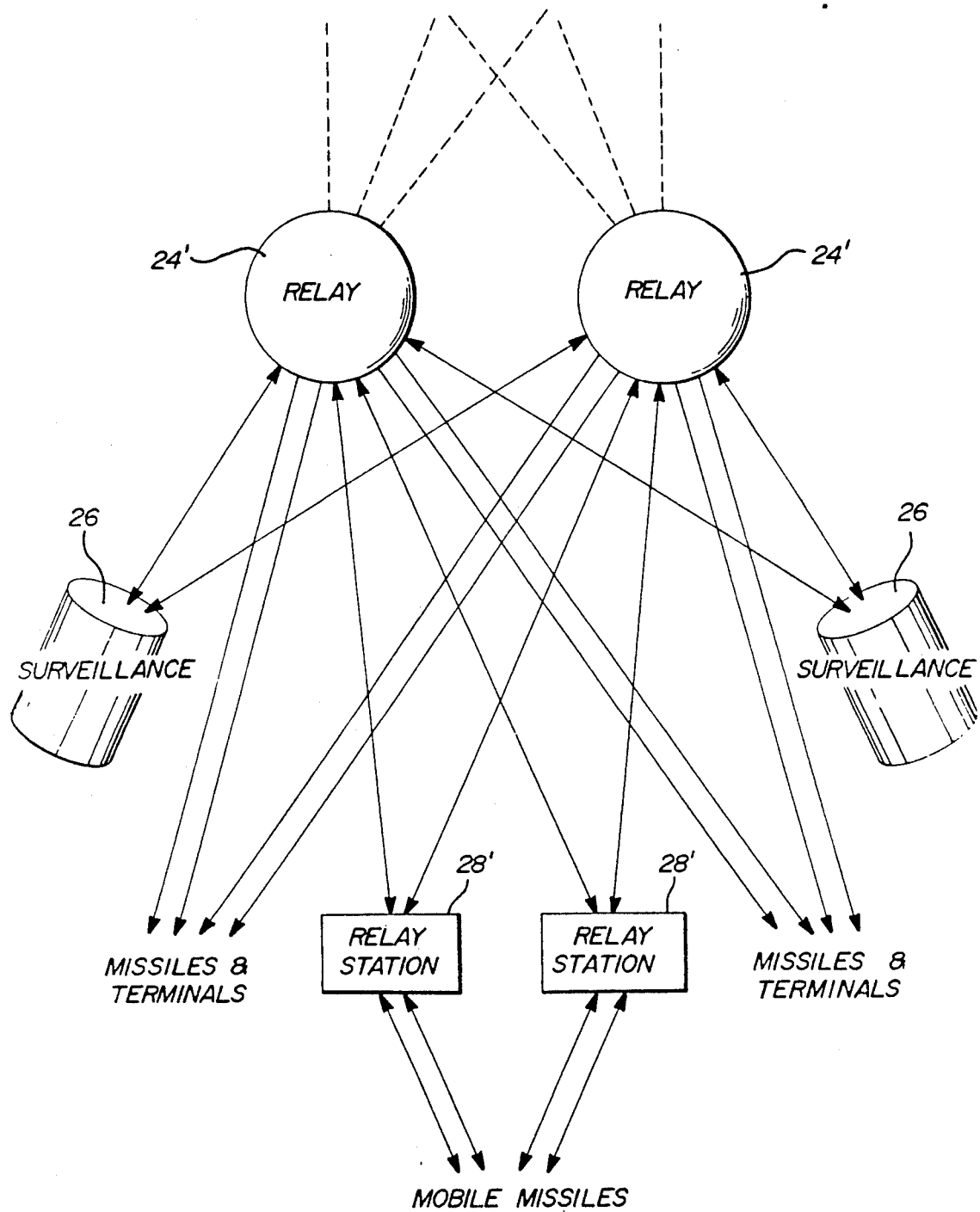
FIG. 14 is a schematic diagram of an alternative embodiment of the communication system in FIG. 1 utilizing multiple relay communication paths.

Referring now to FIGS. 2 and 14, FIG. 14 depicts an alternative embodiment wherein an earth-based relay station 28, a terminal or missile site is in direct communication with more than one relay satellite 24'. In this embodiment the relay satellites 24' carry out identical functions as previously described. The number of possible routing paths as well as the number of necessary communication channels are increased however.

As shown in FIG. 2, the preferred embodiment of the present invention also includes earth-based relay stations 28 which function in the same manner as the relay satellites 24. The stations 28 demodulate, decode and decipher signals received from the relay satellites 24 that are intended for the mobile missile sites in the same manner as shown in FIG. 9 for the relay satellites 24. The control logic of the relay station sends messages to their appropriate destination by routing the messages to the appropriate communication channel in the same way as described above and shown in FIG. 9. The control logic manipulates the encryption and frequency band of each channel based on the control messages that it receives. The stations 28 then retransmit these signals on the appropriate frequencies to the appropriate mobile missile sites using the appropriate encryption key. Likewise, signals sent from mobile missile sites that are intended for the relay satellites are received by the stations 28 and retransmitted to the relay satellites 24.

The CCCS satellites 20 are also in communication with surveillance satellites 26 through one or more relay satellites 24. They are in low earth orbit, and will move in and out of a particular relay satellites' communication range. The surveillance satellites 26 use infrared lenses and radar imaging to detect nuclear detonations or rocket launchings on the ground and provide this information to the CCCS.

In the preferred embodiment of the present invention, a unique firing code, the code that must be sent to a missile in order to fire it, is hardwired into each missile. This firing code is known only by the CCCS. When placing one of the adversaries missiles into the active state, the CCCS provides the adversary at their terminal with a randomly generated first set of launch sequences corresponding to each missile. The CCCS derives a corresponding second set of secret launch sequences so that a predefined calculation involving each two corresponding launch sequences results in the firing codes of the corresponding missiles. Thus, the launching sequences are different every time missiles are put into the active state. Each missile interface takes as one input the first launch sequence from the adversary's terminal and as a second input, the second launch sequence from the CCCS. The missile interface performs the predefined calculation on these two sequences and outputs the result to the missile. With the correct sets of launch codes the missile can then be armed and fired. This state remains until the missile is armed or until the CCCS invalidates its set of launch codes. In the preferred embodiment, multiple key techniques of the type commonly used in encryption systems are implemented to perform the calculation.

Figure 3:
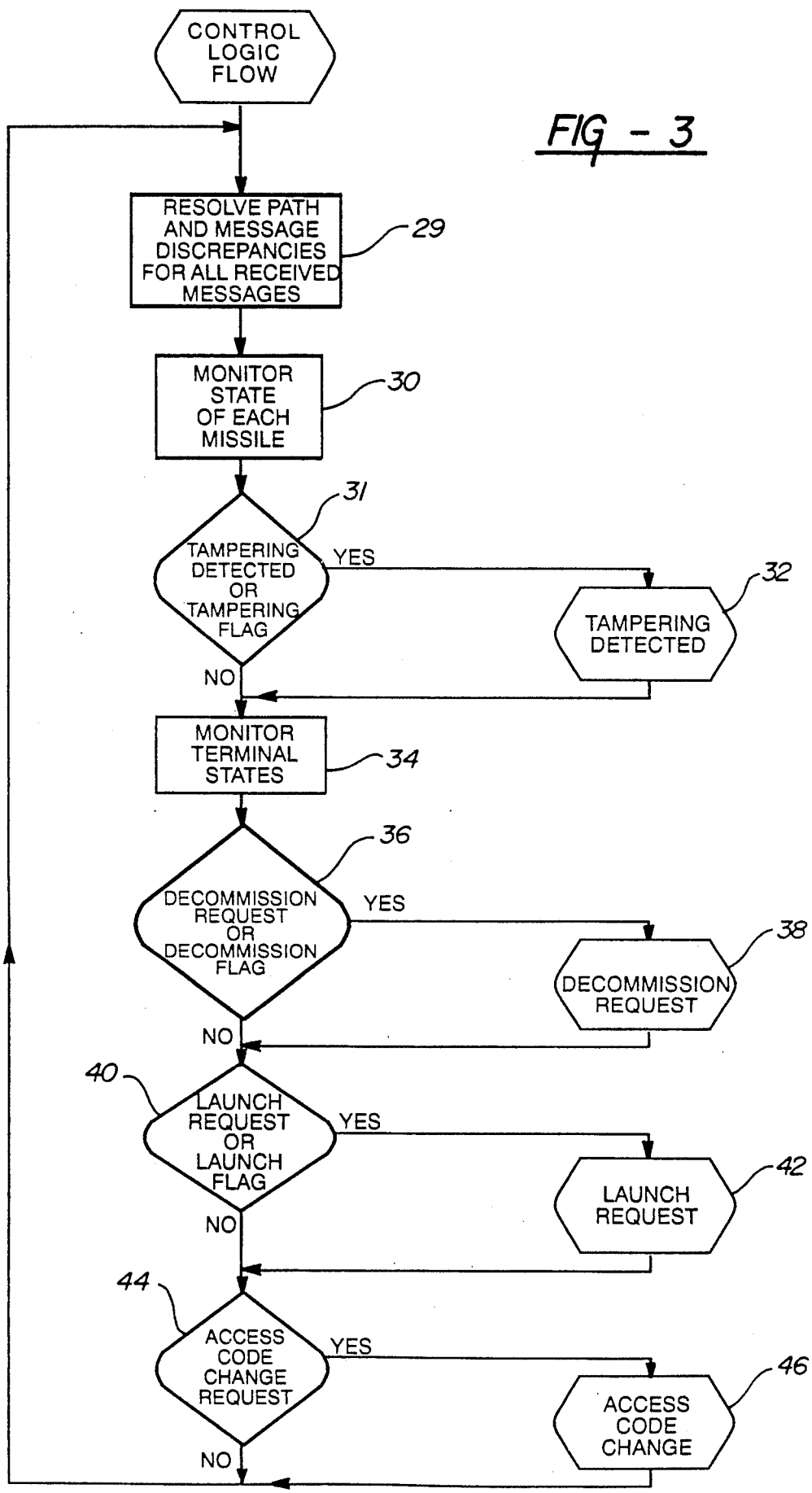
FIG. 3 is a logic flow diagram of the missile control logic algorithm of the present invention.

FIG. 3 depicts the flow diagram for the main loop of the missile control logic algorithm. In the alternative embodiment of FIG. 13, this algorithm is performed by each of the CCS satellites 20', and each CCS satellite 20' dictates action based on its own computations.

The first step of the main loop is indicated at 29 in FIG. 3. At this point, any discrepancies, either in the message itself or the paths the message was sent on, are resolved for all received messages as was explained earlier with reference to FIG. 8. Next at step 30, the state of each missile is monitored. The message transmitted from the missile either indicates that the missile status is intact or that there has been tampering with the missile. The tampering of a missile includes an unauthorized attempt to submit a launch sequence to the missile. If the message notes a tampering, all parties are notified through their terminals. If the missile is mobile, then provision must be taken for the possibility of the destruction or the incapacitation of the deployment vehicle. A missile type is determined from its identification code.

Figure 4:
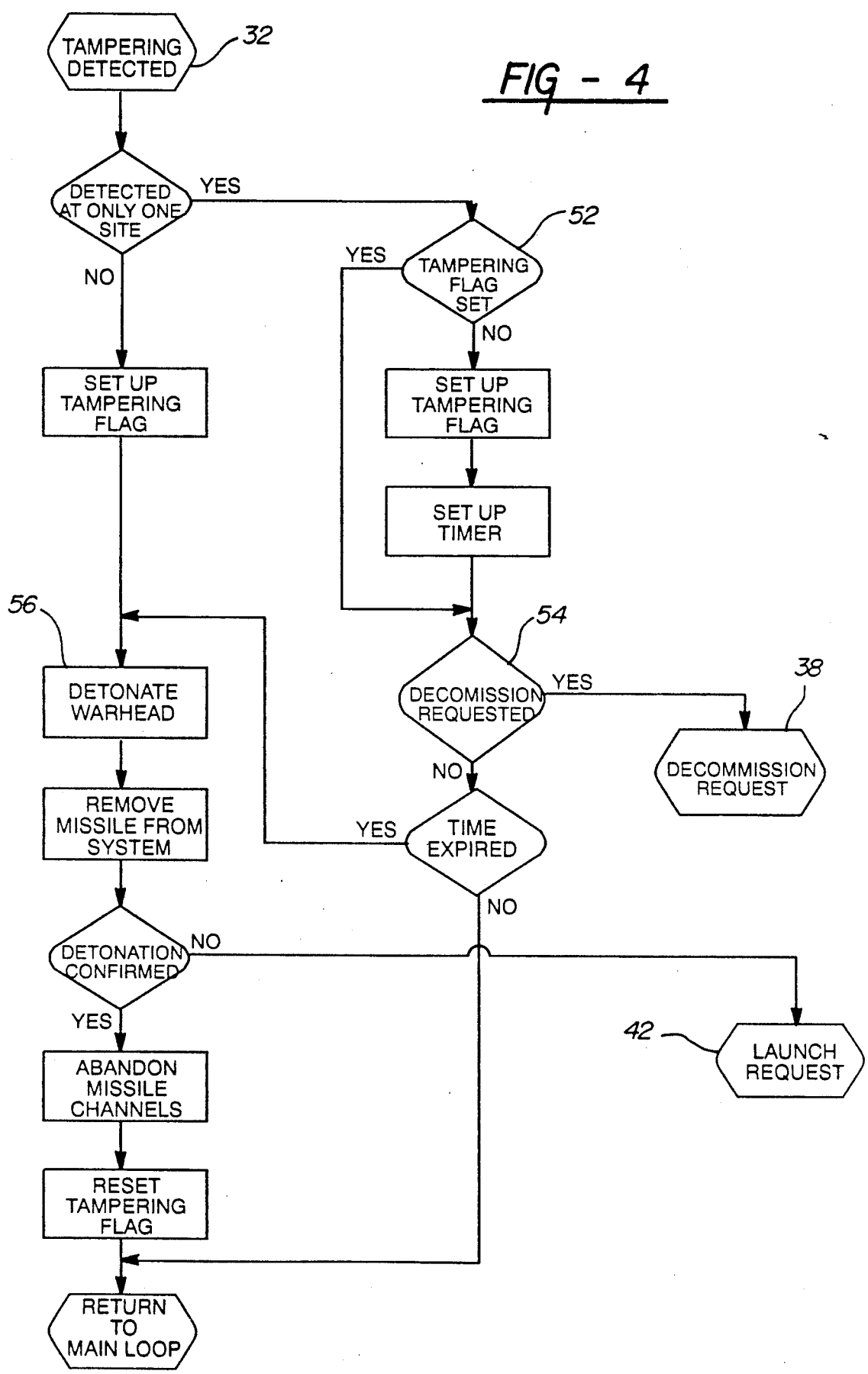
FIGS. 4, 5, 6, and 7 are logic flow diagrams of subroutines in the logic flow diagram of FIG. 3.

As indicated at 31 and 32 of FIG. 3, when a tampering is detected, the "Tampering Detected" routine is executed. This routine is executed once for each missile where tampering is detected or where a tampering flag, described subsequently, is set. The flow diagram for the "Tampering Detected" algorithm 32 is depicted in FIG. 4.

First, the algorithm checks if tampering has been detected at only one site. This is achieved by utilizing two global counters, one for each adversary, that are initialized to zero and are incremented each time there is a tampering detected for the corresponding adversary. For the purposes of the present invention, a site is defined as either a single land based missile silo, or as a mobile deployment vehicle. In other words, all land based sites store only one missile, while mobile sites may have a plurality of missiles. If tampering is detected at more than one site, the algorithm sets the tampering flag and jumps to the step indicated at 56. If there is tampering detected at only one site, at step 52 it is checked whether the tampering flag is set. If the flag is set the algorithm jumps to the step indicated at 54. On the first execution of the routine for the detected tampering, the tampering flag is not set at step 52. If this is the case, the tampering flag is set and a timer is started. The algorithm then goes to the step indicated at 54.

At 54, it is checked whether a decommission has been requested. If so, the "Decommission Request" routine, indicated at 38, is executed. In the case where there are multiple missiles detected of tampering at the same site, then a different decommission request must be made for each of these missiles. If no decommission request is received at 54, it is checked whether the timer has expired. If not, the algorithm exits and returns control to the main loop. In this case, the routine will be re-entered on the next iteration of the main loop. If the timer has expired, the algorithm goes to the step indicated at 56.

At 56, the CCCS attempts to detonate all of the warheads at the site in question. Next, the CCCS removes all missiles destroyed by the detonation from the system, and it is checked whether the detonation has been confirmed. Such confirmation can be made by the infrared lenses on the surveillance satellites 26. If the detonation is verified, the appropriate missile communication channels are abandoned, the tampering flag is reset, and control is returned to the main control loop. If the detonation is not confirmed, the "Launch Request" routine 42 is executed and the system acts as if the tampering party has requested a first strike.

At the next step, 34, of the main loop, the state of the command terminals are monitored. The following is a list of all possible valid messages from the terminals:

1. Launch request;
2. Withdraw launch request;
3. Access code changes;
4. Decommission request;
5. Decommission consent;
6. Decommission consent pending;
7. Withdraw decommission consent pending;
8. Adversary release launch codes.

Figure 5:
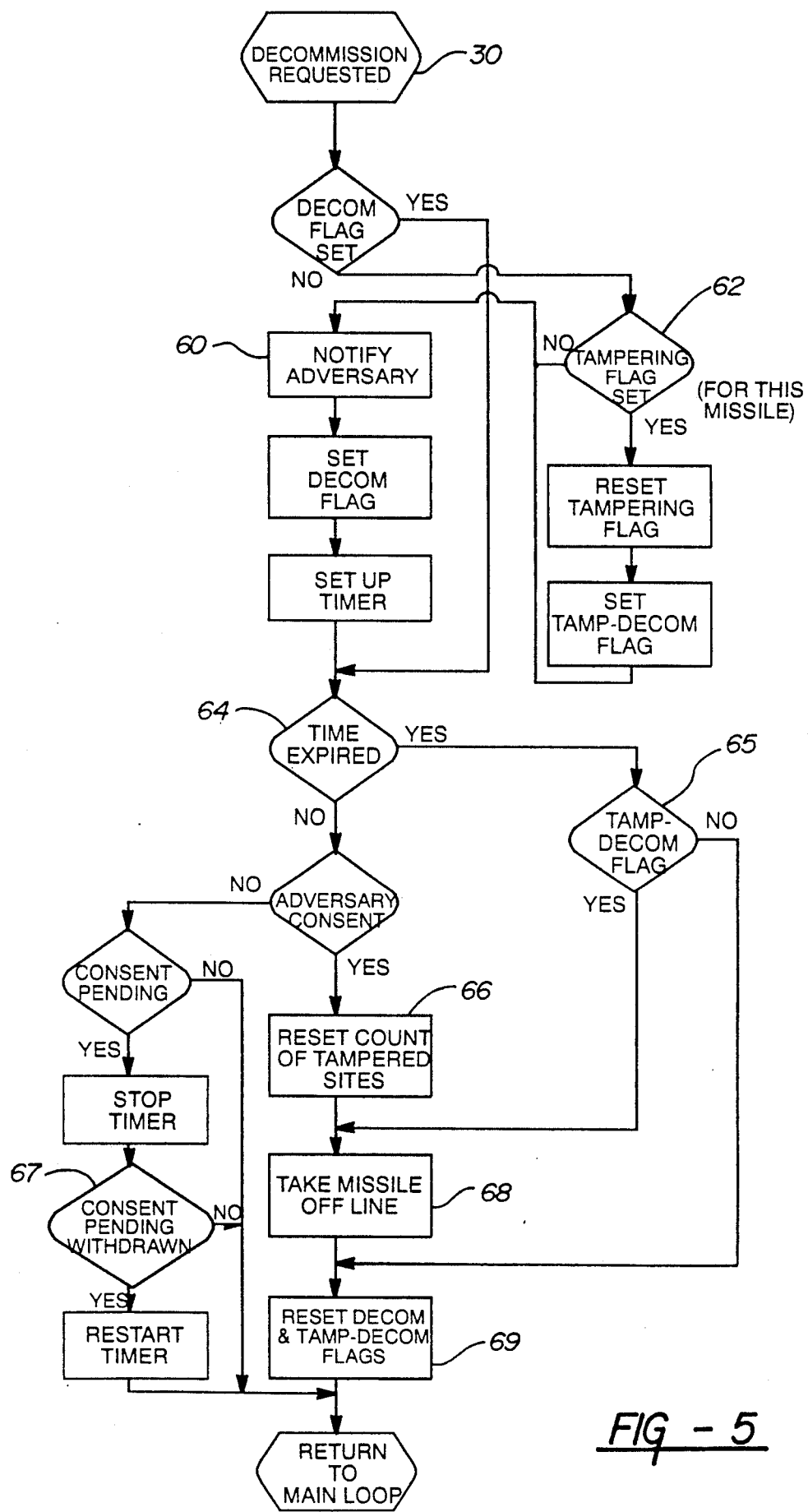

As indicated at 36 and 38 of FIG. 3, a request for decommission causes the "Decommission Request" routine to be executed. This routine is also executed if a decommission flag, described subsequently, is set. The flow diagram for the "Decommission Request" algorithm is depicted in FIG. 5. Initially, the algorithm checks whether the decommission flag is set. If the flag is set, the algorithm jumps to the step indicated at 64. During the first execution of this routine, the flag will not be set. If this is the case, the algorithm goes to the step indicated at 62 and checks if the tampering flag is set. If it is not, the algorithm skips to the step indicated at 60. If the tampering flag is set at 62, the tampering flag is reset and a tampering-decommission flag is set. The algorithm continues with step 60.

At step 60, the adversary is notified of the decommission request. Next, the decommission flag is set, and a timer is started. The next step of the algorithm is indicated at 64.

At step 64, it is checked whether the timer is expired. If it is expired, the algorithm goes to the step indicated at 65. If the timer is not expired at step 64, it is checked whether the adversary has consented to the decommission. If so, the algorithm goes to the step indicated at 66. If no consent has been received, it is checked whether the adversary has issued a consent pending command from their terminal. If not, control is returned to the main loop and the "Decommission Request" routine will be executed again in the next iteration of the main loop. If the adversary has issued a consent pending command, the timer is stopped and the algorithm goes to the step indicated at 67.

At step 67, it is checked whether the previous consent pending command has been withdrawn. If not, control is returned to the main loop and the "Decommission Request" routine will be executed again in the next iteration of the main loop. If, at 67, the consent pending has been withdrawn, the timer is restarted and control is returned to the main loop. Once again, in this case the routine will be executed in the next iteration of the main loop.

At step 66, if the tampering-decommission flag is set, the count of tampered sites is reset to zero. The algorithm then continues to the step indicated at 68 in which the communication channels to the missile in question are closed and the missile is removed from the system. Next, the algorithm continues to the step indicated at 69 in which the tampering, the decommission, and the tampering-decommission flags are reset. Next, the "Decommission Request" routine is exited and control is returned to the main loop.

At step 65, it is checked whether the tampering-decommission flag is set. If it is, the algorithm goes to step 68, continues to step 69, and then exits the routine. If the tampering-decommission flag is not set at step 65, the algorithm goes to step 69 and then exits the routine. It should be noted that if a decommission request is made for more than one missile, then the routine is executed for each missile sequentially.

Figure 6:
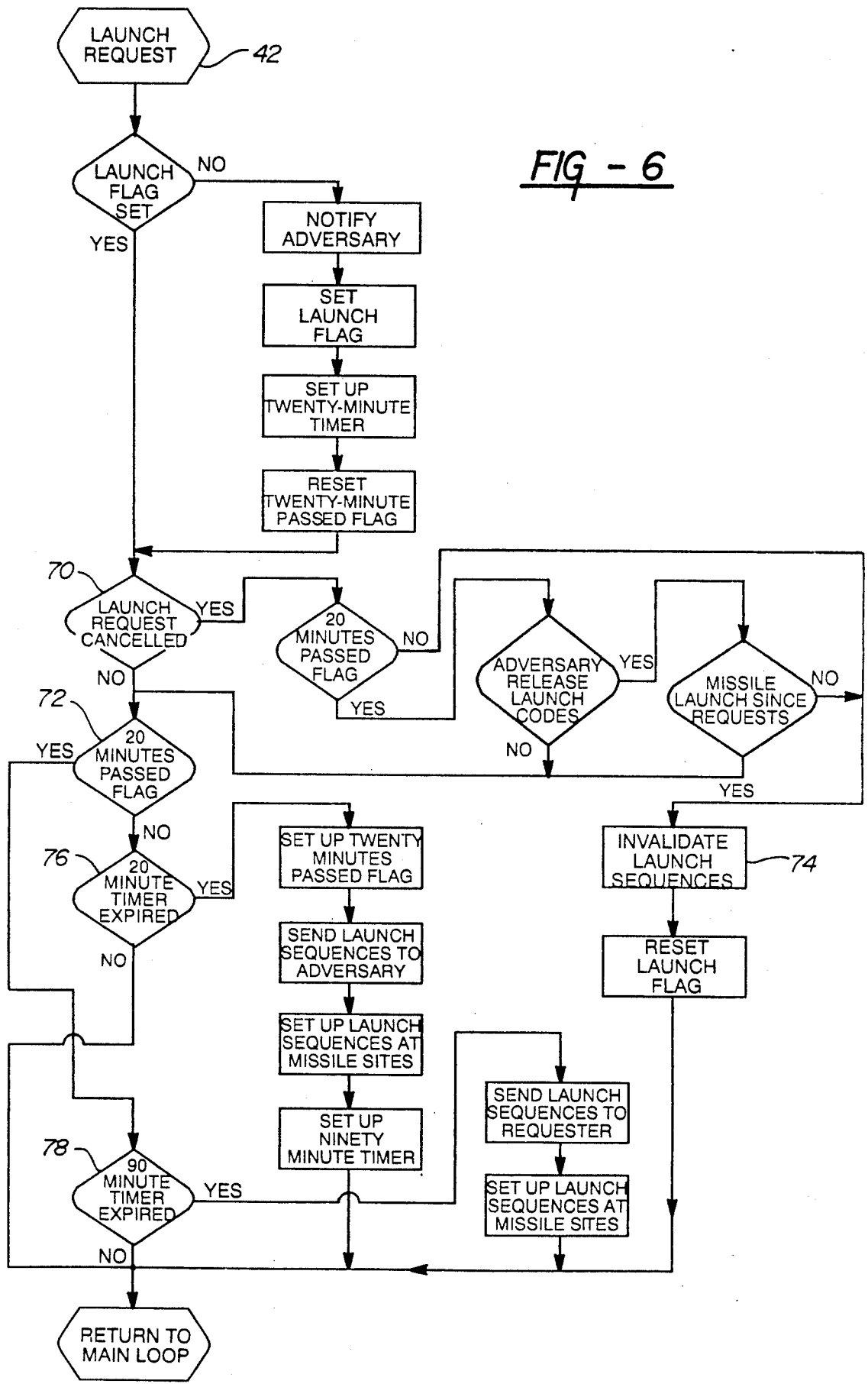

As indicated at 40 and 42 of FIG. 3, a terminal launch request causes the "Launch Request" routine to be executed. This algorithm is also executed if a launch flag, to be described subsequently, is set. The flow diagram for the "Launch Request" algorithm is depicted in FIG. 6.

Initially, this algorithm checks whether the launch flag is set. If it is, the algorithm goes to the step indicated at 70. When the routine is executed for the first time after the request, the launch flag will not be set (it is initialized to false). If the launch flag is not set, the following actions are taken before continuing with the normal operation of the routine. First, the adversary is notified of the request. Then, the launch flag is set and a twenty minute timer is started. Finally, a twenty minute passed flag is set to no (reset).

At the next step, indicated at 70, it is checked whether the initiating party has canceled the launch request. If not, the algorithm goes to the step indicated at 72. If there is a launch cancellation request at 70, it is checked whether the twenty minute passed flag is set. If not, the algorithm skips to the step indicated at 74. If the flag is set, it is checked whether the non-requesting adversary has released their launch codes. If not, the algorithm goes to step 72. If the codes have been released, it is checked whether any missiles have been launched after both the request by the initiating party to cancel the launch and the request by the adversary to release their launch codes. If missiles have been launched, the algorithm goes to step 72. Otherwise, the algorithm continues at step 74.

At step 74, the launch sequences are invalidated by the CCCS. Next, the launch flag is reset, the routine is exited, and control is returned to the main loop.

At step 72, it is checked whether the twenty minute passed flag is set. If it is, the algorithm goes to the step indicated at 78. If the flag is not set, the algorithm continues at 76 by checking whether the twenty minute timer has expired. If not, control is returned to the main loop. In this case, the Launch Request routine will be executed again in the next iteration of the main loop.

If the twenty minute timer is expired at step 76, the following actions are taken. First, the twenty minutes passed flag is set. Next, appropriate launch sequences are sent to the non-requesting adversary, and their missiles are prepared to receive these launching sequences. Finally, a ninety minute timer is started and the algorithm returns control to the main loop. In this case, the Launch Request routine will be executed again in the next iteration of the main loop.

At step 78, it is checked whether the ninety minute timer is expired. If not, control is returned to the main loop and the routine will be executed again in the next iteration of the main loop. If the ninety minute timer is expired at 78, the appropriate launch sequences are sent to the initiating party, their missiles are prepared to receive these sequences, and control is returned to the main loop. In this case, the routine will be executed again in the next iteration of the main loop.

Finally, as indicated at 44 and 46 of FIG. 3, a terminal access code change request causes the "Access Code Change" routine to be executed. The algorithm for this routine is depicted in FIG. 7. As described earlier, each terminal has an access code which the user must supply with all requests. When making an access code change request, the user must also supply the new access code. The algorithm simply changes that terminals access code in the memory of the CCCS and notifies the requester of the change. The algorithm is then exited and control is returned to the main loop.

The above algorithms describe the general flow of operation of the CCCS. The preferred embodiment of the present invention also includes some communication from the CCCS to the command terminals that is not explicitly shown in the above algorithms. This communication includes reporting the status of any activated timers, reporting the current status of the flags and counters, and the echoing of commands using the same routing procedure as described earlier. As previously stated, the routines are to be run in parallel execution. For multiple missiles, each missile will have unique flags, timers, and generate unique decisions.

Information networking techniques are necessary to control the communication between the different satellites, computers, missiles, and terminals. The networking of messages is carried out through originator and destination information contained in the messages through the earlier described routing procedures. When a message arrives at a destination, the originator of the message is immediately known regardless of the links over which the message has traveled. The message itself contains all the necessary routing information as shown in FIG. 9. For example, a message sent by a control satellite to a mobile missile destination would tell a relay satellite which earth-based relay station is to receive the message. The message also contains information telling the earth-based relay station which missile site the information must go. Thus, the steering of information, regardless of the path used, is controlled by the originator of the message. Where there is more than one possible path between the source and the destination of a message as shown in FIG. 14, redundant messages can be sent through the multiple paths, thus increasing reliability of the system. That is, if the destination can be reached through multiple relay stations or relay satellites, all possible paths of communication can be used.

Figure 10:
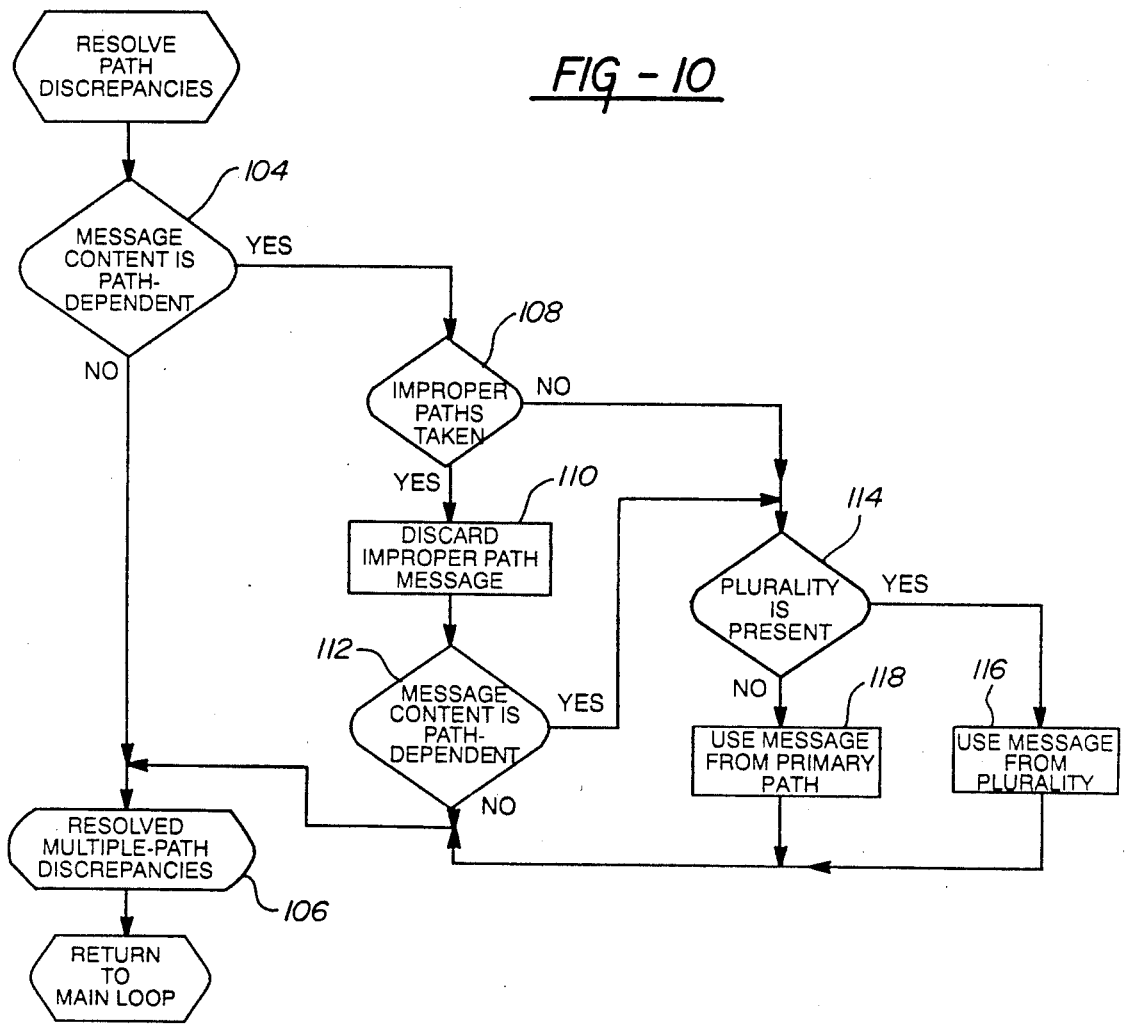
FIG. 10 is a logic flow diagram of a communications path discrepancy resolution diagram.

The destination component must be able to arbitrate the meaning of messages whose content varies over the path but which originated at the same source. This arbitration process is shown by the logic flow diagram of FIG. 10, and is carried out to assure the integrity of the communication paths when the multiple path embodiment of FIG. 14 is deployed. As shown in FIG. 10, an incoming message is received by a system component over one or more paths 104. If the message is identical over all paths, then multiple path discrepancies have been resolved and the content of the message is further evaluated as shown at step 80 of FIG. 8. (Note: there can be no conflict if a single communication path is used).

If the message from a source varies over the path taken, the destination component's control logic must arbitrate to determine the valid message sent by the source. At step 108, if any message has arrived over an improper path, i.e., the path of communication for the message did not correspond to the path specified in the message, then this message is discarded, step 110. As stated earlier in reference to FIG. 9, if a relay satellite or a relay station receives a message over a channel other than that specified, it appends this information to the received message before retransmitting. If a message is thus discarded, the algorithm checks whether a discrepancy still exists 112. If not, the message can be further evaluated at step 106. If a discrepancy still exists, the control logic determines at step 114 is there is a plurality of paths which brought the same message. At step 116, if the plurality of paths is present, the message is attributed to the source and the message can be further evaluated at step 106. If a plurality of paths is not present, the message attributed to the source will be that one received over the primary communication path, step 118. The primary path is designated as such by the control logic as the most direct and reliable path of communications.

In the alternative embodiment shown in FIG. 13, multiple paths are available and used between two directly linked components as discussed previously. For example, a relay satellite 24' could use two or more separate channels to send messages to one CCS 20'. In this case, redundant messages can be sent over the two or more channels. Each channel is separately maintained and the destination arbitrates multiple-path discrepancies in the same manner as described above. For each of the two or more paths from the relay satellite 24' to the CCS 20', there is an associated channel from the CCS 20' to the relay satellite 24'.

In order to further ensure the security and integrity of the communication channels between satellites, command terminals, missiles and other linked components, the preferred embodiment of the present invention utilizes a communication channel management system where the communication interfaces between linked components are capable of communicating at different frequency bands. A unique frequency bandwidth is assigned for each channel of communication between every set of linked components within the present invention which communicate. For each link, a particular carrier frequency is chosen at any time from the bandwidth appropriated for that link. This bandwidth is assigned such that no bandwidths of one link overlaps with the bandwidth of any other link, thus eliminating intercomponent interference. Also, these carrier frequencies are perpetually changed to maintain the secrecy of communications. Similarly, unique data encryption keys are maintained for each communication channel. These encryption keys are also continuously changed simultaneously with the changing of the frequency bands.

Allocation of a frequency bandwidth is made from a set of carrier frequencies that linked components are capable of communicating on. For each communication link, one component is responsible for selecting carrier bandwidth and encryption keys from the appropriate possibilities. This component is known as the master. The linked component which responds to that selection is known as a slave. For example, the CCCS component is a master component when linked to a relay satellite, which would then be a slave. A relay satellite would be a master component when linked to any of its corresponding slave components such as surveillance satellites, relay stations, terminals or missile sites. The relay station is a master component when linked to the missile site, a slave component. Between two linked CCS's of FIG. 13, the master component is designated arbitrarily.

Figure 11:
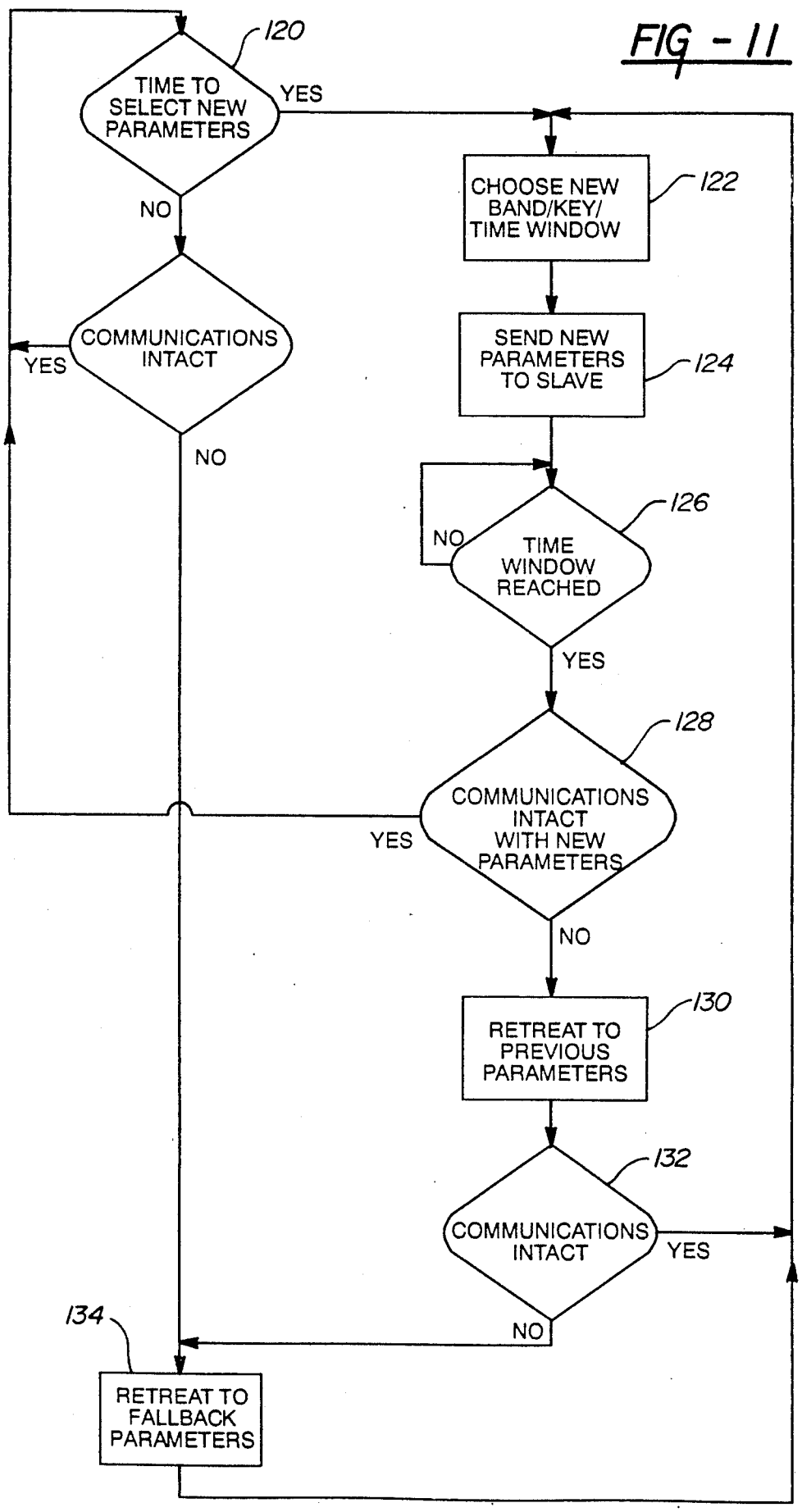
FIGS. 11 and 12 are logic flow diagrams of communication parameter selection algorithms utilized by the system components in the present invention.
Figure 12:
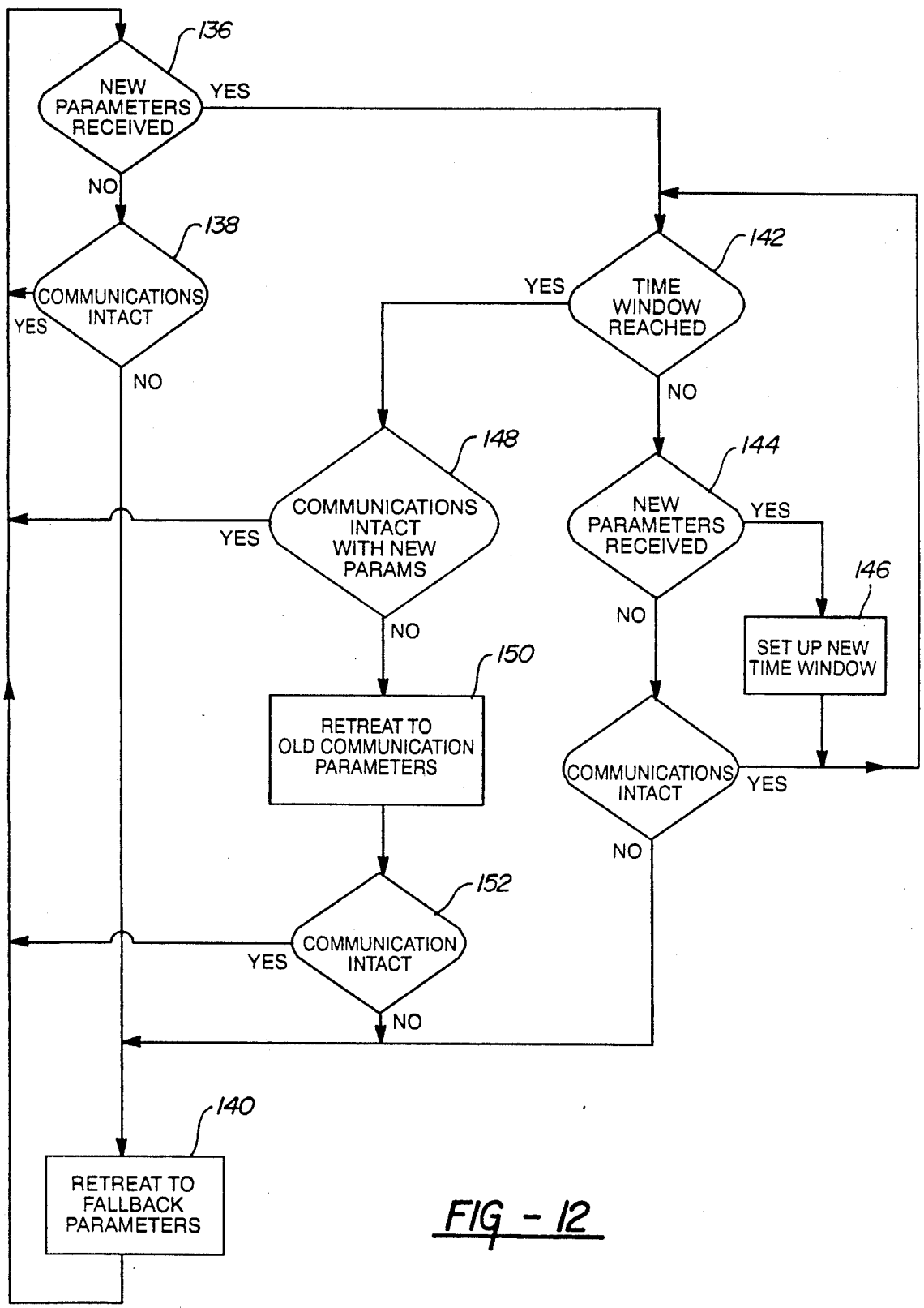

Referring now to FIGS. 11 and 12, there are shown logic flow diagrams of communication parameter selection algorithms used by the master and slave links in a communication link. The communication parameter selection algorithm is executed by the control logic concurrently for each communication channel. In the relay satellites, the relay stations, and the CCCS's which have slave channel links, the algorithms of FIGS. 11 and 12 will be concurrently executed, each applying to different command channels.

Two linked components within the system communicate on two separate communication channels having separate communication parameters. For example, a relay satellite transmits messages to a missile site on one communication channel and receives messages from the missile site on a completely different channel, thus establishing a two-way link between the two components. The master component, such as the relay satellite from the above example, selects the communication parameters, including frequencies, encryption keys and time window, for both communication channels. If there is more than one two-way link between two components, the algorithm for the separate two-way links are executed separately. The frequency band and the encryption key data are passed as messages form the master component to the slave component. These messages also contain a time window indicating when use of the new frequency and encryption data will begin.

As shown in FIG. 11, when a new set of communication parameters are selected by the master component, the master sends them as a message to the slave component. The master continues to send status information messages to the slave, maintaining normal communications with the present parameters, until the time window is reached at step 126. At that time, any message received or sent will use the new communication parameters. If, at step 138, messages are received intact after the time window expires, that is, status or other messages arrived regularly on that frequency and the deciphered messages are valid ones), then the algorithm for that channel returns to the beginning of the algorithm step 120. If, however, messages are not received intact at the new time window, the two links of the master retreat to the previous parameters as shown at step 130. If the messages received are valid, then the algorithm returns to step 122. If the receiving communication link is not intact at step 132, the master retreats to the fallback parameters shown as step 134. These fallback parameters are set up to be used only in the case that communications are down. They do not change and they are used only long enough to reestablish communications with the new parameters at step 122.

The algorithm of FIG. 12 is executed for all links designated as slave links or slave components. For any set of two-way slave links, encryption key and frequency band use remain the same as long as no new parameters are received as shown at step 136. If communications are not intact at step 138, then the associated receiving and transmitting parameters retreat to the fallback parameters at step 140. If new parameters are received at step 136, the slave continues normal communication while awaiting the expiration of the time window step 142. At step 144, if new parameters are received before the time window expires, the new time window is set up at step 146 and the control remains in the loop. If the new time window is reached at step 142, the new parameters are set up for transmission and receiving. If the receiving channel receives valid messages as shown at step 148, then control returns to the top of the loop, step 136, otherwise the slave retreats to the old parameters, step 150. If, at step 152, these messages are received intact the algorithm returns to the top of the loop step 136. If the valid messages are not received at step 152, the slave retreats to its fallback parameters at step 140. If communications drop out before the time window is reached, the control logic retreats to the fallback parameters at step 140.

As described above, if communications are not intact, the master resumes communications with the previous parameters. If the previous parameters are not intact, the master retreats to the fallback parameters. The slave, when not receiving valid messages from the master, retreats to previous parameters and, if necessary, retreats to the fallback parameters also. In this way, the slave can communicate to the master that is not receiving valid messages. This scheme enables recovery given the possibility of interference on a certain frequency band. It also allows recovery from the possibility that communication parameters are incorrectly transmitted by the master or incorrectly interpreted by the slave. The fallback bands and fallback encryption key data are only used in the event of interfering signals or disruption of communication links for other reasons, and are only used as back-up frequencies, meaning that these frequencies cannot be used by the channel in normal operation.

In an alternative embodiment, a spread spectrum communication technique may be employed using a code division multiple access protocol, with the channels hopping frequencies, to ensure secure links. In this embodiment, any change in the carrier frequency band will be done as previously stated.

To further preserve the integrity of the signals, digital messages are encoded with additional error detection and correction bits. A message to be transmitted is created as a digital bit sequence. As shown in FIG. 9, the source, destination and routing information are appended to the message at its creation. The message is then encrypted at step 98 and manipulated to contain error correction bits at step 100. Upon receipt of the message at any site, the message is demodulated to a digital bit stream and that bit stream is checked against the error detection/correction bits. If a reconcilable error is detected, it is then corrected. This greatly increases the error detection and correction of the transmitted messages. A message received by a relay station or relay satellite which is to be passed on must, after encrypting the message with the appropriate encryption key, encode the message to include error correction bits. All satellite interfaces are capable of encoding and decoding these messages, and a common error correction algorithm is used by all components of the system.

In an alternative embodiment, the mutual missile control system can be used in conjunction with an anti-missile defense system. In this embodiment, the two systems cooperate so that a missile launched through the proper channels provided by the mutual missile control system as described above will not be destroyed by the anti-missile defense system. Missiles launched outside the authority of the mutual missile control system, or rogue missiles, will be eliminated by the defense system to its full abilities. Rogue missiles include missiles not integrated into the mutual missile control system such as missiles possessed by a party not integrated into the mutual missile control system, missiles which have been decommissioned, or missiles that have been tampered with and were launched without authorization of the mutual missile control system.

Figure 15:
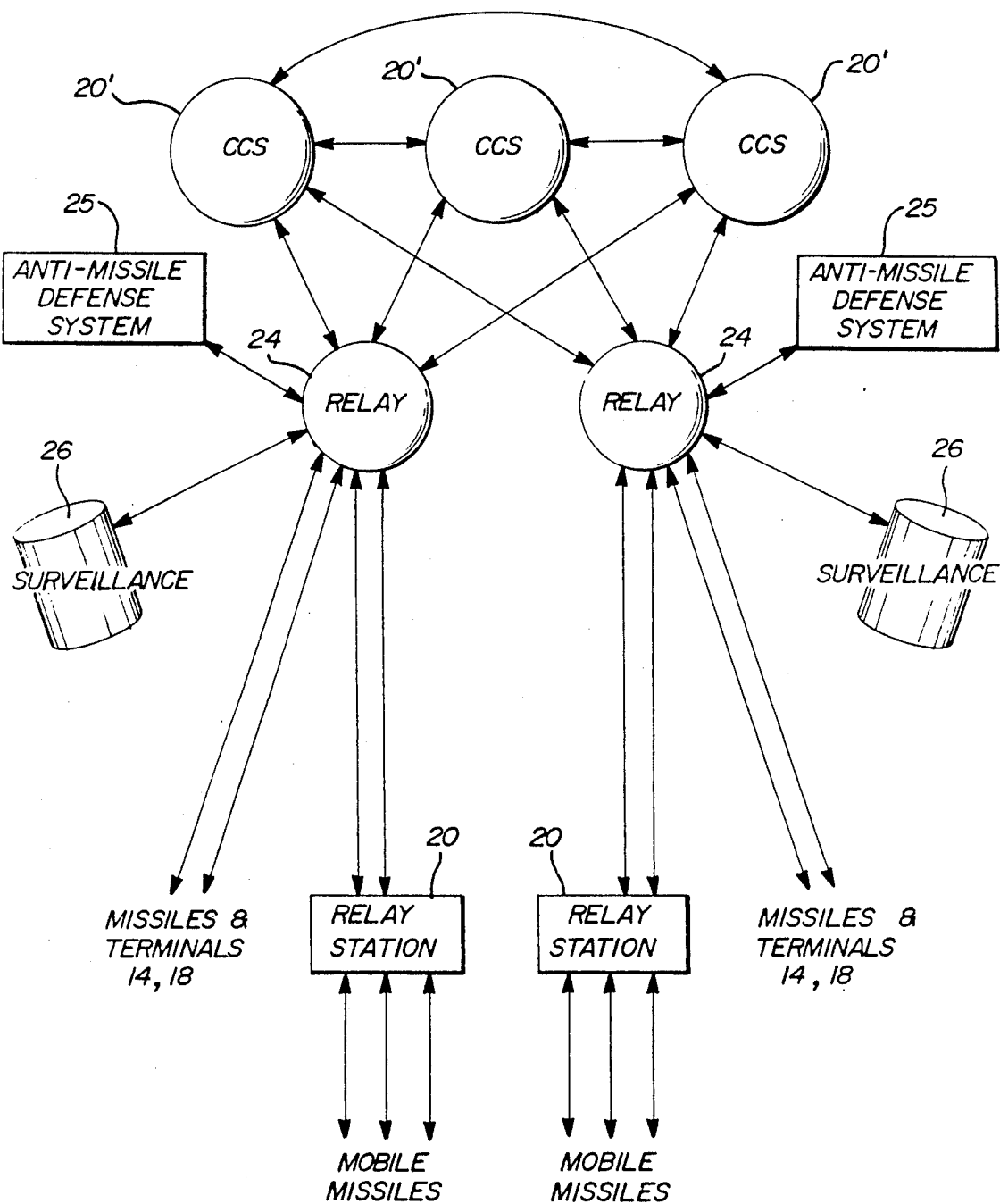
FIG. 15 is a schematic diagram of an alternative embodiment of the satellite communication system of FIG. 13.

Referring now to FIG. 15, there is shown a schematic diagram of this alternative embodiment utilizing the mutual missile control system depicted in FIG. 13. The embodiment of FIG. 15 provides an interface between the mutual missile control system and an anti-missile defense system 25. This interface consists of communication channels from relay satellites 24 to the anti-missile defense system 25 as well as additional communication channels from relay satellite 24 to the control satellites 20'. In this embodiment, after a missile has been properly launched as authorized by the mutual missile control system, the CCS 20' pass this information to the defense system 25 through relay satellite 24. Information such as the location of origin of the fired missile, the time of the launch, the type of missile, the number of warheads and any other information kept by control satellite 20' about the missile is sent as a message to the defense system 25. The message is transmitted through relay satellites 24 which route the message onto the proper communication channels linked to the defense system 25. All messages sent to defensive system 25 from control satellites 20' are in the same format as messages used within the mutual missile control system as described above. Communications to the defensive system 25 are handled and routed identically as messages within the mutual missile control system. Relay satellites 24 are responsible for selecting carrier frequency and encryption key data. Relay satellites 24 communicate these selections to the defensive system in the same way as it communicates them to the earth-based relay stations as described previously and shown with reference to FIG. 9.

If a missile is launched validly through the mutual missile control system, the CCS 20' will send to the defense system 25 a message requesting that the defense system 25 not destroy the missile. If the missile is silo-based, the location of the missile is also sent.

In the case that a missile launch not authorized by the CCS 20' is detected by mutual missile control system surveillance satellites 26, the launched missile is a rogue. The CCS 20' will pass this information to the defense system 25, and the defense system 25 can take all possible steps to destroy the rogue missile. In the case where the defense system 25 detects a missile launch and receives no information from the mutual missile control system, the defense system infers that a rogue missile has teen launched.

The present invention need not be limited to the orbiting satellite system of the preferred embodiment. Alternatively, the central control computer system may be stationed on land remote from the territories of the adversaries. Many different systems may be employed to defend such a remote station. In an alternative embodiment of the present invention, the preferred embodiment may be extended to work for greater than two adversaries.

Having thus described my invention,
We claim:

1. A system to control the firing of a plurality of armaments, control of which is divided between first and second adversaries, each adversary controlling a separate geographic territory, comprising:
   a central computer remote from the territories of the first and second adversaries;
   a first computer terminal under the control of a first adversary;
   a firing control system operatively associated with each of the armaments, the system having a first normal inactive state wherein the armament is prevented from being fired, and a second active sate wherein firing of the armament is enabled;
   a first communication channel between the central computer and each of said first and second computer terminals and a second communication channel between the firing control system of each of the armaments and at least one of the central computer and the computer terminal controlling such armaments;

means for transmitting a request from either of said computer terminals to said central computer, said request specifying that the firing control systems of the armaments controlled by the requesting terminal be switched from said first state to said second state;

means associated with the central computer, operative, upon receipt of said request from the terminal of a first of said adversaries, to: (1) transmit a signal to the second of said adversaries, switching the firing control systems of the armaments of said second adversary from said first state to said second sate, and (2) further operative to transmit a signal to the first adversary, switching its firing control systems from the first state to the second state only after a predetermined time period, whereby a request by either of the adversaries to activate their armaments is answered by activation of the other adversaries armaments, and delayed activation of the requesting parties armaments.

2. A system as set forth in claim 1 wherein said central computer is disposed on an orbiting satellite.

3. A system as set forth in claim 1 including at least one orbital surveillance satellite supporting an infrared lens for detecting any detonations or launches on the ground.

4. A system as set forth in claim 1 including a plurality of redundant central computers.

5. A system as set forth in claim 4 wherein each of said central computers monitors the status of the remaining central computers.

6. A system as set forth in claim 1 wherein said communication channels between the central computer and the terminals are established through a relay station.

7. A system as set forth in claim 6 wherein said relay station is disposed on a satellite.

8. A system as set forth in claim 6 wherein said relay station includes means for changing communication frequencies.

9. A system as set forth in claim 1 wherein said communication channels between the central computer and the armaments are established through a relay station.

10. A system as set forth in claim 9 wherein said relay station is disposed on a satellite.

11. A system as set forth in claim 10 including an earth based relay station for establishing communication channels between said relay satellites and those of said armaments that are mobile.

12. A system as set forth in claim 9 wherein said relay station includes means for changing communication frequencies.

13. A system as set forth in claim 12 wherein the data transmitted on said communication channels is encrypted, and wherein said central computer includes means for changing the encryption keys.

14. A system as set forth in claim 9 wherein said central control computer includes means for implementing a spread spectrum communication technique, utilizing a code division multiple access protocol, to ensure the security of said communication channels.

15. A system as set forth in claim 1 wherein said central computer includes means for changing the communication frequency employed in said communication channels.

16. A system as set forth in claim 1 wherein at least one of said armaments includes means for changing the communication frequencies used on said first and second communication channels between said firing control systems and at least one of said central control computer and said command terminal controlling said armaments.

17. A system as set forth in claim 1 further including a computer means disposed on each of the armaments to monitor the status thereof.

18. A system as set forth in claim 1 including means operatively associated with at least one of said armaments to detect tampering.

19. A system as set forth in claim 18 wherein said tamper detecting means comprises means to detect changes in temperature.

20. A system as set forth in claim 18 wherein said tamper detecting means comprises means to detect changes in armament telemetry.

21. A system as set forth in claim 18 wherein said tamper detecting means comprises means to detect physical entry into said armament.

22. A system as set forth in claim 18 further including means adapted to communicate detected tampering to said central computer.

23. A system as set forth in claim 1 wherein said central computer includes means for detonation of said armament upon detection of tampering.

24. A system as set forth in claim 1 wherein said central computer includes means to selectively decommission each of said armaments.

25. A system as set forth in claim 1 including means to restrict access to each of said computer terminals.

26. A system as set forth in claim 25 wherein said computer terminal access restriction means is adapted to perform at least one verification test chosen from the group consisting essentially of: palm print identification, retina identification, voice print identification, and cryptographic access code identification.

27. A system as set forth in claim 1 wherein each of said armaments include means to receive a unique firing code from said firing control systems, whereby said firing codes are required to be communicated to said armaments in order for the state of said systems to be changed from said inactive state to said active state.

28. A system as set forth in claim 27 wherein each of said firing control systems of said armaments include means to receive as a first input from said command terminal through said communication channels a first launch sequence, and as a second input from said central control computer through said communication channels a second launch sequence, whereby said firing control systems are programmed to perform a predetermined calculation on said first and second launch sequences and transmit the result of said operation directly to said armament.

29. A system as set forth in claim 28, wherein said central control computer includes means to randomly generate and transmit to said command terminals via said communication channels a first set of said first launch sequences, each corresponding to a different armament, and then derive, from said first set, a second set of said second launch sequences, each sequence corresponding to a different sequence in said first set, whereby when said firing control system of a specific armament takes as input a corresponding set of said first and second launch sequences, the output of said predetermined calculation is equal to said armament's firing code.

30. A system as set forth in claim 1 further including means for establishing communication channels to an anti-missile defense system.

* * * * *